(12) United States Patent
Morris et al.

(10) Patent No.: US 7,680,999 B1
(45) Date of Patent: Mar. 16, 2010

(54) PRIVILEGE PROMOTION BASED ON CHECK OF PREVIOUS PRIVILEGE LEVEL

(75) Inventors: Dale C. Morris, Menlo Park, CA (US); James M. Hull, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/499,720

(22) Filed: Feb. 8, 2000

(51) Int. Cl.
G06F 12/00 (2006.01)
G06F 12/14 (2006.01)

(52) U.S. Cl. .................. 711/163; 711/151; 711/158; 712/229

(58) Field of Classification Search .................. None
See application file for complete search history.

(56) References Cited

U.S. PATENT DOCUMENTS

| | | | | |
|---|---|---|---|---|
| 4,809,160 | A * | 2/1989 | Mahon et al. | 713/200 |
| 5,133,058 | A * | 7/1992 | Jensen | 711/207 |
| 5,941,977 | A | 8/1999 | Panwar et al. | |
| 5,968,159 | A * | 10/1999 | Mattheis | 710/264 |
| 6,272,533 | B1 * | 8/2001 | Browne | 709/213 |
| 6,363,336 | B1 * | 3/2002 | Banning et al. | 703/26 |
| 6,393,556 | B1 * | 5/2002 | Arora | 712/229 |

FOREIGN PATENT DOCUMENTS

| EP | 0220920 B1 | 7/1991 |
|---|---|---|
| EP | 0208192 B1 | 8/1993 |
| WO | WO 99/19795 | 4/1999 |

OTHER PUBLICATIONS

David M. Gallagher et al., "Dymanic Memory Disambiguation Using the Memory Conflict Buffer," ACM Press, ASPLOS VI Proceedings, pp. 183-193 (Oct. 1994).
European Search Report for Application No. EP 01 30 3750 mailed on Dec. 23, 2002 (3 pages).
Gerry Kane, "PA-RISC 2.0 Architecture," Prentice-Hall, Inc., Hewlett-Packard Professional Books, pp. iii-IN-10 (1996).
European Search Report for Application No. EP 01 30 1111 mailed on Feb. 18, 2003 (3 pages).

* cited by examiner

Primary Examiner—Tuan V Thai
Assistant Examiner—Midys Rojas

(57) ABSTRACT

A secure promotion mechanism promotes a current privilege level of a processor in a computer system. The current privilege level controls application instruction execution in the computer system by controlling accessibility to system resources. An operating system performs a privilege promotion instruction, which is stored in a first page of memory not writeable by an application instructions at a first privilege level. The privilege promotion instruction reads a stored previous privilege level state, compares the read previous privilege level state to the current privilege level, and if the previous privilege level state is equal to or less privileged than the current privilege level, promotes the current privilege level to a second privilege level which is higher than the first privilege level.

24 Claims, 3 Drawing Sheets

PRIVILEGE PROMOTION BASED ON CHECK OF PREVIOUS PRIVILEGE LEVEL

THE FIELD OF THE INVENTION

The present invention relates to privilege promotion in computer systems, and more particularly to a privilege promotion instruction performed by an operating system which checks a stored previous privilege level state prior to promoting a current privilege level of a processor for instruction execution.

BACKGROUND OF THE INVENTION

Computer systems include at least one processor and memory. The memory stores application program instructions, data, and an operating system. The operating system controls the processor and the memory for system operations and for executing the application program instructions. Processors often have a current privilege level which controls the application instruction execution in the computer system by controlling accessibility to system resources, such as system registers, system instructions, and system memory pages. The current privilege level varies between two or more execution privilege levels.

Typical computer systems do not have a mechanism for an application program to call an operating system function to get into higher privileged code to enable the application program to execute a higher privileged routine directly. In this type of typical computer system, the operating system must increase the privilege level in order to fulfill a call to the higher privileged routine. In this type of typical computer system, the application program executes some instruction which takes an interruption to the operating system and places a processor of the computer system at the highest privilege level. While the processor is at the highest privilege level, the operating system evaluates what is required to resolve the interruption, performs the required higher privileged routine, and returns instruction control flow back to the application program. This interruption and operating system operation is quite expensive in processor time and resources.

Some conventional computer systems have a mechanism for the application program to directly call an operating system function to get into higher privileged code to enable the application program itself to directly execute a higher privileged routine. For example, one such mechanism includes a special privilege promotion instruction performed by the operating system to promote the current privilege level of processor to a higher privilege level. This special privilege promotion instruction typically records some state information, including the previous privilege level, in order to permit a subsequent privilege demotion back to the original privilege level. One type of such special privilege promotion instruction is the PA-RISC gateway instruction. If the privilege promotion instruction is genuine, then the previous privilege level state recorded by the privilege promotion instruction can be trusted. Typically, the privilege promotion instruction is guaranteed to be genuine by employing normal virtual memory protection mechanisms to ensure that the privilege promotion instruction is stored on a memory page which cannot be written at the lower privilege level(s).

Even though any information recorded at a lower privilege level cannot be trusted and must be checked at a higher privilege level, the privilege promotion instruction being placed on a memory page which cannot be written at the lower privilege level and the privilege promotion instruction recording the previous privilege level state permits the previous privilege level state to be trusted. However, the privilege promotion instruction writing the previous privilege level state typically requires special processor data paths and control logic not required for any other purpose. In addition, any state for the privilege promotion written at a lower privilege level rather than by the privilege promotion instruction requires extra system instructions executing at the higher privilege level to check the validity of the state written at the lower privilege level, thus lowering the performance of the privilege promotion.

For reasons stated above and for other reasons presented in greater detail in the Description of the Preferred Embodiments section of the present specification, a computer system is desired which employs a privilege promotion instruction for promoting a current privilege level of a processor in the computer system which improves performance of the privilege promotion and does not require special processor data paths and control logic to perform the privilege promotion instruction.

SUMMARY OF THE INVENTION

The present invention provides a computer system and a method of promoting a current privilege level of a processor in the computer system, which is controlled by an operating system. The current privilege level controls application instruction execution in the computer system by controlling accessibility to system resources. The operating system performs a privilege promotion instruction. The privilege promotion instruction is stored in a first page of memory not writeable by application instructions at a first privilege level. The privilege promotion instruction includes reading a stored previous privilege level state and comparing the read previous privilege level state to the current privilege level. If the previous privilege level state is equal to or less privileged than the current privilege level, the privilege promotion instruction promotes the current privilege level to a second privilege level which is higher than the first privilege level.

In one embodiment, if the previous privilege level state is more privileged than the current privilege level, the privilege promotion instruction takes an illegal operation fault.

In one embodiment, the system resources include system registers, system instructions, and memory pages. In one embodiment, virtual memory protection mechanisms are employed to ensure that the first page of memory containing the privilege promotion instruction cannot be written by application instructions at the first privilege level.

One form of the present invention provides a secure privilege promotion/demotion mechanism in a computer system controlled by an operating system. A processor of the computer system executes application instructions at a current privilege level of the processor equal to a first privilege level. The application instructions are stored in a first page of memory. The current privilege level controls the application instruction execution in the computer system by controlling accessibility to system resources. The application instructions perform a call instruction to a second page of memory not writeable by the application instructions at the first privilege level. The call instruction includes storing a return address to the first page of memory and storing the first privilege level in a previous privilege level state. The operating system performs a privilege promotion instruction. The privilege promotion instruction is stored in the second page of memory. The privilege promotion instruction includes reading the stored previous privilege level state and comparing the read previous privilege level state to the current privilege level. If the previous privilege level state is equal to or less privileged than the current privilege level, the privilege promotion instruction promotes the current privilege level to a second privilege level which is higher than the first privilege level. If the previous privilege level state is more privileged than the current privilege level, the privilege promotion instruction takes an illegal operation fault. A return instruction transfers instruction control flow to the stored return address to the first page of memory and demotes the current privilege level to the stored previous privilege level state.

The computer system according to the present invention employs the privilege promotion instruction for promoting the current privilege level of the processor in the computer system based on a check of the previously stored privilege level state, which significantly improves performance of the privilege promotion over the conventional privilege promotion mechanisms described in the Background of the Invention section of the present specification. In addition, the privilege promotion according to the present invention does not require special processor data paths and control logic to perform the privilege promotion instruction as required by the conventional privilege promotion mechanism in which the privilege promotion instruction itself records the previous privilege level state.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
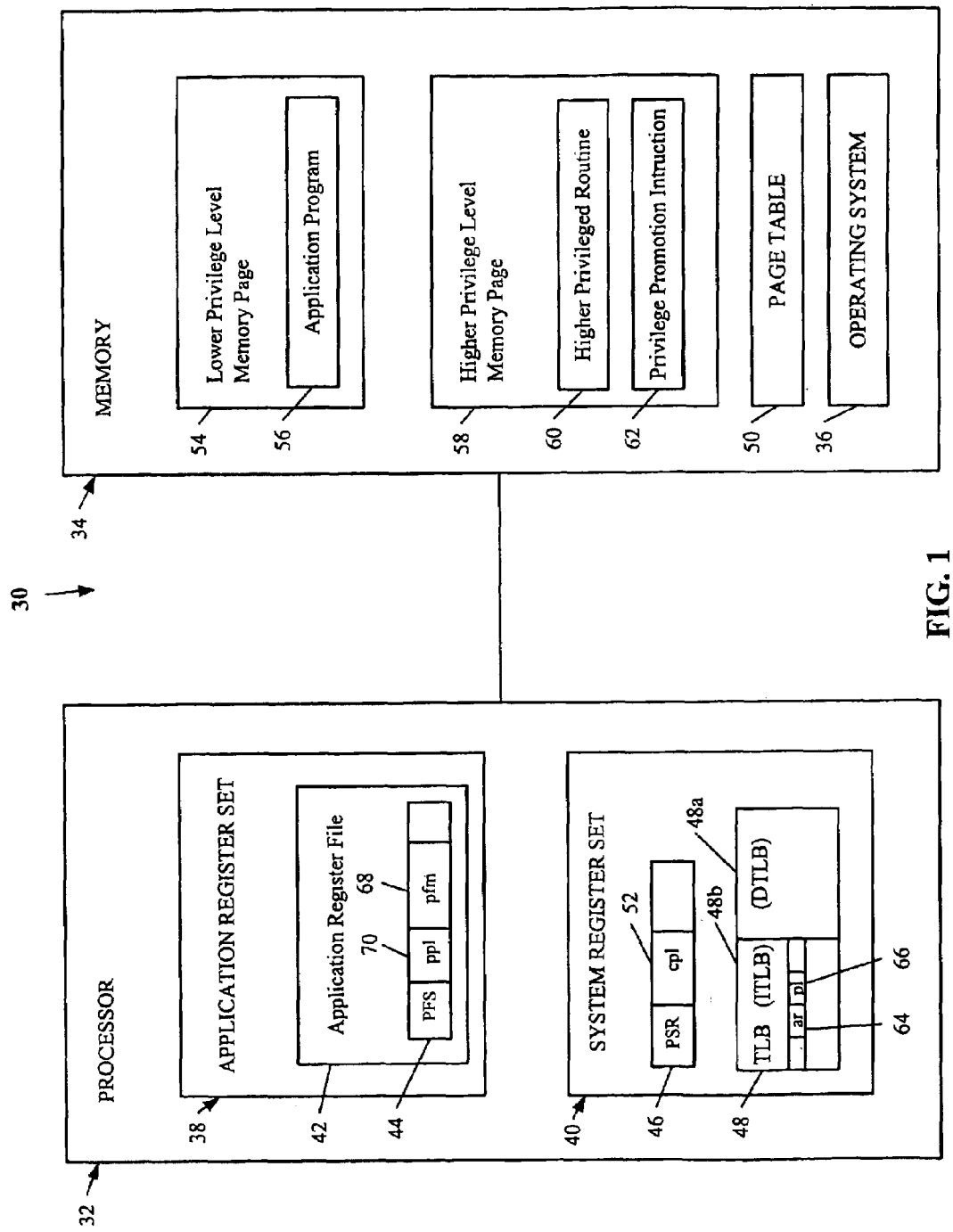
FIG. 1 is a block diagram of a computer system according to the present invention which performs privilege promotion based on a check of a previous privilege level state.

A computer system according to the present invention is illustrated generally at 30 in FIG. 1. Computer system 30 includes at least one processor, such as processor 32, for performing sequences of logical operations. Computer system 30 also includes memory 34 for storing instructions and data for use by processor 32. An operating system 36 is stored in memory 34 and controls processor 32 and memory 34 for system operations and for executing application program instructions stored in memory 34. Memory 34 typically includes random access memory (RAM), non-volatile memory, and a hard disk drive, but can include any known type of memory storage.

Processor 32 includes an application register set 38 and a system register set 40. An architectural state of computer system 30 is represented by application register set 38, system register set 40, and memory 34. Application register set 38 includes registers available to application programs stored in memory 34. System register set 40 provides system register resources for process control, interruption handling, protection, debugging, performance monitoring, and the like. System register set 40 is generally only visible to operating system 36.

Example registers which can be included in application register set 38 include general registers, floating point registers, compare result registers, branching information registers, instruction pointer, current frame marker, process identifiers, and user mask. Application register set 38 specifically includes an application register file 42. Application register file 42 includes special purpose data registers and control registers for application visible processor functions for application instructions. Application register file 42 specifically includes a previous function state (PFS) register 44 having multiple fields which represent values copied automatically on a call instruction from the current frame marker register to accelerate procedure calling.

Example registers which can be included in system register set 40 include region registers, protection key registers, debug break point registers, machine specific registers, and control registers. System register set 40 specifically includes a processor status register (PSR) 46 that maintains control information to define the current execution environment for the current running process of processor 32.

System register set 40 also specifically includes a translation look-aside buffer (TLB) 48 which holds recently used virtual to physical memory address mappings to memory 34. TLB 48 is divided into a data TLB 48a for holding virtual to physical data address mappings and an instruction TLB 48b for holding virtual to physical instruction address mappings. Virtual memory pages are mapped to physical memory pages by a data structure controlled by operating system 36 referred to as a page table 50, which is stored in memory 34 and contains entries which each map a single memory page of memory 34. Page table 50 maps pages containing both instructions and data and typically instructions and data do not share the same page. TLB 48 improves performance by caching page table 50 entries in processor 32.

Processor 32 has a current privilege level represented by a current privilege level field (PSR.cpl) 52 in PSR 46. The current privilege level stored in PSR.cpl field 52 controls accessibility to system resources in processor 32, such as the system registers in system register set 40, system instructions, and system memory pages. The current privilege level stored in PSR.cpl field 52 varies between two or more execution privilege levels.

Programs that include instructions for executing in processor 32 are stored in memory pages bounded in virtual address space. Example virtual memory pages include a memory page 54 for storing an application program 56 having application instructions and a memory page 58 for storing a higher privileged routine 60. Memory page 58 also stores a privilege promotion instruction 62 according to the present invention.

Entries in TLB 48 include an access rights field (TBL.ar) 64 and a privilege level field (TBL.pl) 66. In one embodiment of computer system 30, memory page granular access controls employ four levels of privilege. In one form of this embodiment, privilege level 0 is the most privileged level and has access to all privileged instructions and privilege level 3 is the least privileged level. In one embodiment of computer system 30, access to a memory page is determined by TLB.ar field 64, TLB.pl field 66, and the current privilege level stored in PSR.cpl field 52. Page access rights are defined in Table I below for an example embodiment of computer system 30 having eight levels of access rights defined for the virtual memory page by TBL.ar field 64 and four levels of privilege as defined for the virtual memory page by TBL.pl field 66 and four levels of privilege defined for processor 32 by PSR.cpl field 52.

TABLE I

Page Access Rights

| TBL.ar | TBL.pl | PSR.cpl 3 | PSR.cpl 2 | PSR.cpl 1 | PSR.cpl 0 | Description |
|---|---|---|---|---|---|---|
| 0 | 3 | R | R | R | R | Read only |
|   | 2 | — | R | R | R |   |
|   | 1 | — | — | R | R |   |
|   | 0 | — | — | — | R |   |
| 1 | 3 | RX | RX | RX | RX | Read, execute |
|   | 2 | — | RX | RX | RX |   |
|   | 1 | — | — | RX | RX |   |
|   | 0 | — | — | — | RX |   |
| 2 | 3 | RW | RW | RW | RW | Read, write |
|   | 2 | — | RW | RW | RW |   |
|   | 1 | — | — | RW | RW |   |
|   | 0 | — | — | — | RW |   |
| 3 | 3 | RWX | RWX | RWX | RWX | Read, write, execute |
|   | 2 | — | RWX | RWX | RWX |   |
|   | 1 | — | — | RWX | RWX |   |
|   | 0 | — | — | — | RWX |   |
| 4 | 3 | R | RW | RW | RW | Read only/ read, write |
|   | 2 | — | R | RW | RW |   |
|   | 1 | — | — | R | RW |   |
|   | 0 | — | — | — | RW |   |
| 5 | 3 | RX | RX | RX | RWX | Read, execute/read, write, exec |
|   | 2 | — | RX | RX | RWX |   |
|   | 1 | — | — | RX | RWX |   |
|   | 0 | — | — | — | RWX |   |
| 6 | 3 | RWX | RW | RW | RW | Read, write, execute/read, write |
|   | 2 | — | RWX | RW | RW |   |
|   | 1 | — | — | RWX | RW |   |
|   | 0 | — | — | — | RW |   |
| 7 | 3 | X | X | X | RX | Exec, promote/read, execute |
|   | 2 | XP2 | X | X | RX |   |
|   | 1 | XP1 | XP1 | X | RX |   |
|   | 0 | XP0 | XP0 | XP0 | RX |   |

Within each cell of Table I above, "–" represents no access, "R" represents read access, "W" represents write access, "X" represents execute access, and "Pn" represents promote PSR.cpl field 52 to privilege level "n" when a privilege promotion instruction according to the present invention, such as privilege promotion instruction 62, is executed.

In one embodiment, processor 32 verifies page level permissions to a given virtual page by verifying privilege levels, page level read and write permission, and protection key read and write permission.

Referring to Table I above, execute-only pages (e.g., TLB.ar=7) can be used to promote the current privilege level stored in PSR.cpl field 52 on entry into operating system 36. Lower privileged code, such as application program 56, can call into a promotion memory page, such as memory page 58, controlled by operating system 36. Operating system 36 executes a privilege promotion instruction, such as privilege promotion instruction 62 according to the present invention, to promote the current privilege level stored in PSR.cpl field 52. When the privilege promotion instruction successfully promotes the current privilege level stored in PSR.cpl field 52, a higher privileged routine, such as higher privileged routine 60, can be executed directly by the application program without an overhead of an interruption to operating system 36. A procedure return branch instruction demotes the current privilege level stored in PSR.cpl field 52 back to the original lower privilege level after the higher privileged routine has been executed.

Figure 2:
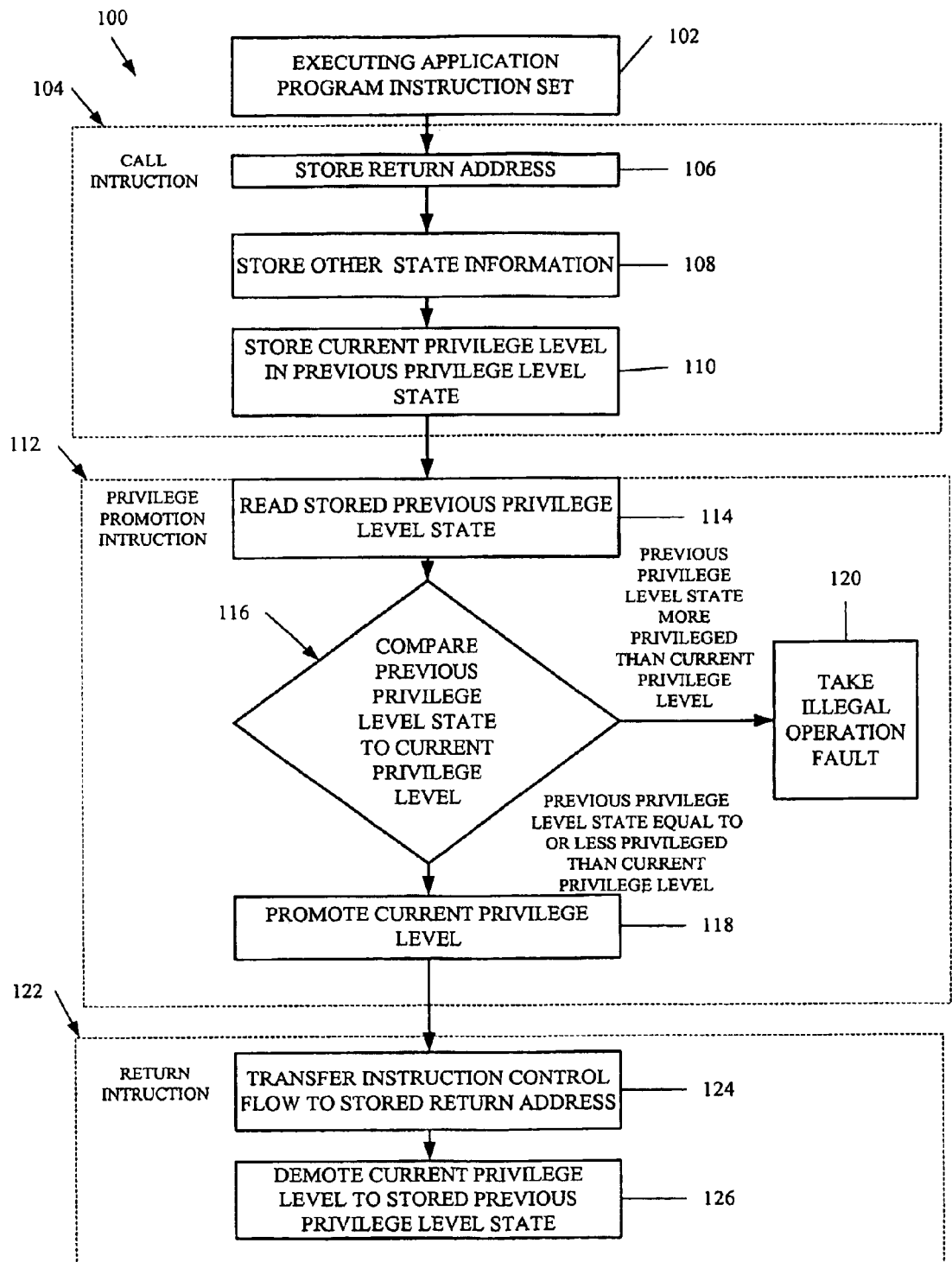
FIG. 2 is a flow diagram illustrating an operation of a secure privilege promotion/demotion mechanism performed in the computer system of FIG. 1.

One embodiment of an operation of a secure privilege promotion/demotion mechanism performed in computer system 20 is illustrated generally at 100 in flow diagram form in FIG. 2. At step 102, processor 32 executes application program 56 at a low current privilege level (e.g., PSR.cpl=3) from memory page 54. The current privilege level stored in PSR.cpl field 52 controls the application program 56 instruction execution in computer system 30 by controlling accessibility to system resources, such as system registers in system register set 40, system instructions, and memory pages of memory 34.

At step 104, a call instruction is performed to memory page 58 which contains higher privileged routine 60 and privilege promotion instruction 62. The call instruction 104 includes step 106 of storing the return address to memory page 54. Call instruction 104 also includes step 108 of storing other state information other than the return address, such as saving the current frame marker in a previous frame marker field (PFS.pfm) 68 of PFS register 44. At step 110, call instruction 104 specifically stores the current privilege level from PSR.cpl field 52 into a previous privilege level field (PFS.ppl) 70 of PFS register 44.

At step 112, operating system 36 performs privilege promotion instruction 62 to promote the current privilege level of processor 32 stored in PSR.cpl field 52. Performing privilege promotion instruction 62 includes step 114 of reading the stored previous privilege level state in PFS.ppl field 70. Performing privilege promotion instruction 62 also includes step 116 of comparing the previous privilege level state in PFS.ppl field 70 to the current privilege level in PSR.cpl field 52. If the previous privilege level state stored in PFS.ppl field 70 is equal to or less privileged than the current privilege level stored in PSR.cpl field 52, at step 118 operating system 36 promotes the current privilege level stored in PSR.cpl so that application program 56 can directly execute higher privileged routine 60. If the previous privileged level state in PFS.ppl field 70 is more privileged than the current privilege level in PSR.cpl field 52, at step 120 privilege promotion instruction 62 takes an illegal operation fault.

At step 122, after higher privileged routine 60 has performed its function called by application program 56, higher privileged routine 60 performs a return instruction. At step 124, return instruction 122 transfers instruction control flow to the return address to memory page 54 stored at step 106 of call instruction 104. At step 126, return instruction 122 demotes the current privilege level in PSR.cpl field 52 to the previous privilege level state stored in PFS.ppl field 70 at step 110 of call instruction 104.

Figure 3:
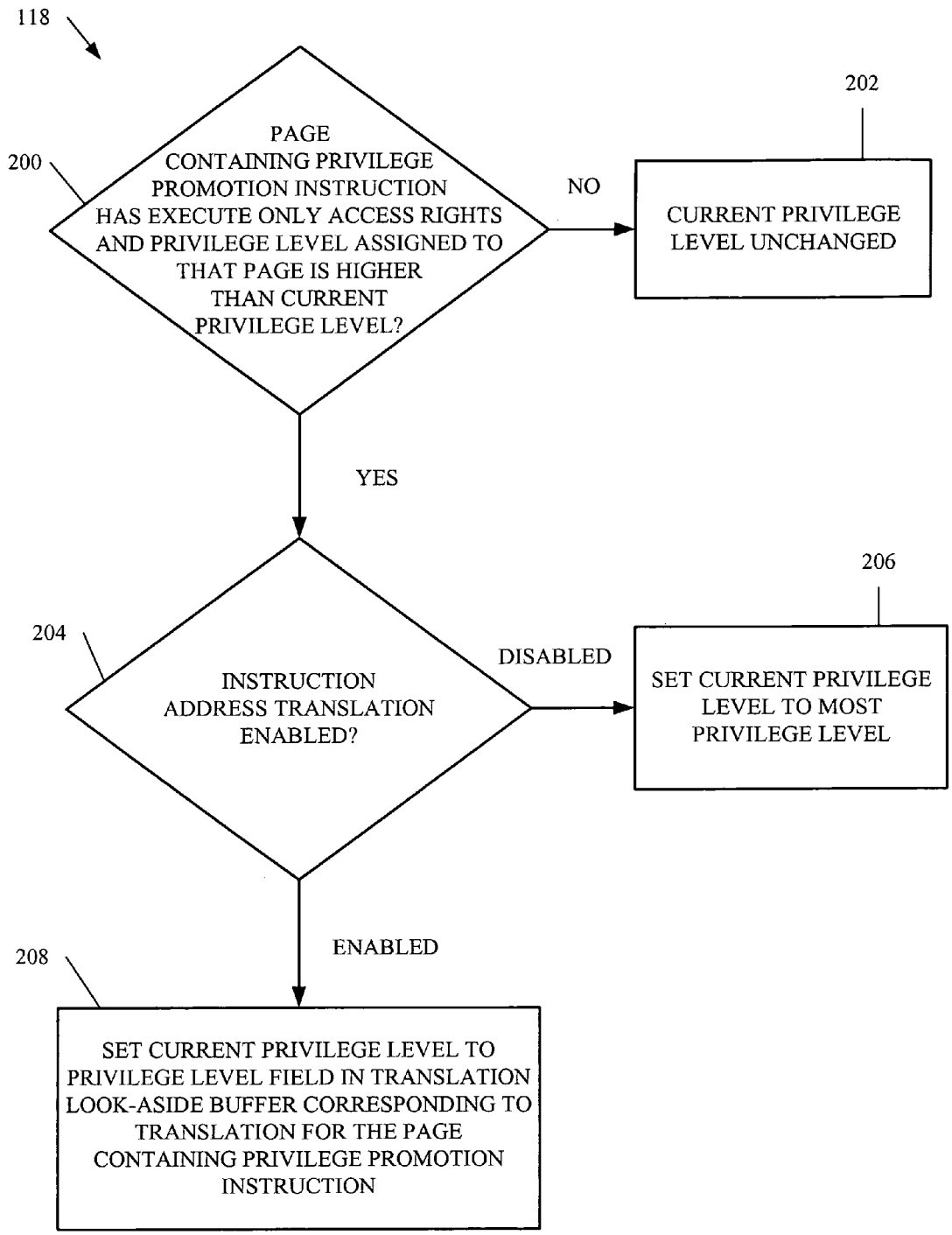
FIG. 3 is a flow diagram illustrating one embodiment of a method of promoting the current privilege level of a processor in the computer system of FIG. 1 during the execution of a privilege promotion instruction according to the present invention.

One embodiment of step 118 for promoting the current privilege level in PSR.cpl field 52 during the execution of the privilege promotion instruction 62 is illustrated in flow diagram form in FIG. 3. At step 200, processor 32 determines whether memory page 58 containing privilege promotion instruction 62 has execute-only access rights in TLB.ar field 64 and the privilege level assigned to memory page 58 in TLB.pl field 66 is higher than the current privilege level in PSR.cpl field 52.

At step 202, if memory page 58 containing privilege promotion instruction 62 has any other access rights besides execute-only or if the privilege level assigned to memory page 58 is lower or equal to the current privilege level in PSR.cpl field 52, then no promotion is taken (i.e., the current privilege level in PSR.cpl field 52 is unchanged). If, however, memory page 58 containing privilege promotion instruction 62 has execute-only access rights and the privilege level assigned to memory page 58 is higher than the current privilege level in PSR.cpl field 52, flow passes to step 204.

At step 204, processor 32 determines if instruction address translation is enabled. If instruction address translation is disabled, at step 206, the current privilege level in PSR.cpl field 52 is set to the most privileged level (e.g., PSR.cpl=0). If instruction address translation is enabled, at step 208, the current privilege level in PSR.cpl field 52 is set to the privilege level field (i.e., TBL.pl field 66) in the translation for memory page 58.

The above-described privilege promotion/demotion mechanism of computer system 30 and the specific example embodiment of promoting the current privilege level of processor 32 via the privilege promotion instruction 62 according to the present invention is a secure and efficient method of privilege promotion. The call instruction performed by application program 56 is made to memory page 58 containing privilege promotion instruction 62, and memory page 58 is protected from being written by application program 56 at the lower privilege level by normal virtual memory protection mechanisms. If the privilege promotion instruction succeeds, higher privileged routine 60 is guaranteed that the privileged information saved by the call instruction can be trusted, because the privilege promotion instruction performed by operating system 36 checks whether the previous privilege level state in PFS.ppl field 70 is equal to or less privileged than the current privilege level in PSR.cpl field 52 prior to promoting the current privilege level.

By contrast, the conventional mechanism described in the Background of the Invention section of the present specification employs a privilege promotion instruction which itself records the previous privilege level state. Since the privilege promotion instruction according to the present the invention does not write the previous privilege level state, no special data paths or control logic are required with the privilege promotion mechanism according to the present invention. In addition, since the privilege promotion instruction according to the present invention checks the validity of the previous privilege level state written at the lower privileged level by application program 56, no additional instructions are required at the higher privileged level routine 60 to perform these checks resulting in increased performance.

Having call instruction 104 save the previous privilege level state in PFS.ppl field 70 in step 110, adds minimal complexity, because call instruction 104 already saves other state information, such as the return address. For example, a copy of the current frame marker is saved as the previous frame marker in PFS.pfm field 68. Similarly, return instruction 122 must read other state information, such as the return address, so there is minimal added complexity to reading the stored previous privilege level state in PFS.ppl field 70 when demoting the current privilege level in PSR.cpl field 52 to the stored previous privilege level state in PFS.ppl field 70. For example, the previous frame marker in PFS.pfm field 68 is stored as the current frame marker in return instruction 122.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of promoting a current privilege level of a processor of a computer system controlled by an operating system, wherein the current privilege level controls application instruction execution in the computer system by controlling accessibility to system resources, the method comprising:
performing a privilege promotion instruction by the operating system, the privilege promotion instruction being stored in a first page of memory not writeable by application instructions at a first privilege level, the privilege promotion instruction including:
reading a stored previous privilege level state;
comparing the read previous privilege level state to the current privilege level; and
if the previous privilege level state is equal to or less privileged than the current privilege level, promoting the current privilege level to a second privilege level which is higher than the first privilege level.

2. The method of claim 1 wherein the step of performing the privilege promotion instruction further includes:
if the previous privilege level state is more privileged than the current privilege level, taking an illegal operation fault.

3. The method of claim 1 wherein the system resources include system registers.

4. The method of claim 1 wherein the system resources include system instructions.

5. The method of claim 1 wherein the system resources include memory pages.

6. A method of executing instructions in a computer system controlled by an operating system, the method comprising:
executing application instructions in a processor of the computer system at a current privilege level of the processor equal to a first privilege level, wherein the application instructions are stored in a first page of memory, and wherein the current privilege level controls application instruction execution in the computer system by controlling accessibility to system resources;
performing a call instruction to a second page of memory not writeable by the application instructions at the first privilege level, the call instruction including:
storing a return address to the first page of memory; and
storing the first privilege level in a previous privilege level state; and
performing a privilege promotion instruction by the operating system, the privilege promotion instruction being stored in the second page of memory, the privilege promotion instruction including:
reading the stored previous privilege level state;
comparing the read previous privilege level state to the current privilege level; and
if the previous privilege level state is equal to or less privileged than the current privilege level, promoting the current privilege level to a second privilege level which is higher than the first privilege level.

7. The method of claim 6 further comprising:
performing a return instruction including:
transferring instruction control flow to the stored return address to the first page of memory; and
demoting the current privilege level to the stored previous privilege level state.

8. The method of claim 6 wherein the step of performing the privilege promotion instruction further includes:

if the previous privilege level state is more privileged than the current privilege level, taking an illegal operation fault.

9. The method of claim 6 wherein the system resources include system registers.

10. The method of claim 6 wherein the system resources include system instructions.

11. The method of claim 6 wherein the system resources include memory pages.

12. A computer system comprising:
a processor having a current privilege level which controls application instruction execution in the computer system by controlling accessibility to system resources and having a previous privilege level state;
a memory having a plurality of memory pages including a first memory page storing a privilege promotion instruction, wherein the first memory page is not writeable by application instructions at a first privilege level; and
an operating system stored in the memory for controlling the processor and memory, and performing the privilege promotion instruction as follows:
reads the previous privilege level state;
compares the read previous privilege level state to the current privilege level; and
if the previous privilege level state is equal to or less privileged than the current privilege level, promotes the current privilege level to a second privilege level which is higher than the first privilege level.

13. The computer system of claim 12 wherein the operating system performing the privilege promotion instruction further includes:
if the previous privilege level state is more privileged than the current privilege level, taking an illegal operation fault.

14. The computer system of claim 12 further comprising:
system registers, and wherein the system resources include the system registers.

15. The computer system of claim 12 wherein the system resources include system instructions.

16. The computer system of claim 12 wherein the system resources include memory pages.

17. A computer system comprising:
a processor having a current privilege level which controls application instruction execution in the computer system by controlling accessibility to system resources;
a memory having a plurality of memory pages including a first memory page storing application instructions and a second memory page storing a higher privileged routine and a privilege promotion instruction, wherein the second memory page is not writeable by the application instructions at a first privilege level;
an operating system stored in the memory for controlling the processor and memory;
wherein the processor executes the application instructions with the current privilege level equal to the first privilege level and the application instructions perform a call instruction to the second memory page as follows:
stores a return address to the first memory page; and
stores the first privilege level in a previous privilege level state; and
wherein the operating system performs the privilege promotion instruction as follows:
reads the stored previous privilege level state;
compares the read previous privilege level state to the current privilege level; and
if the previous privilege level state is equal to or less privileged than the current privilege level, promotes the current privilege level to a second privilege level which is higher than the first privilege level.

18. The computer system of claim 17 wherein the processor via the higher privileged routine performs a return instruction as follows:
transfers instruction control flow to the stored return address to the first page of memory; and
demotes the current privilege level to the stored previous privilege level state.

19. The computer system of claim 17 wherein the operating system performing the privilege promotion instruction further includes:
if the previous privilege level state is more privileged than the current privilege level, taking an illegal operation fault.

20. The computer system of claim 17 further comprising:
system registers, and wherein the system resources include the system registers.

21. The computer system of claim 17 wherein the system resources include system instructions.

22. The computer system of claim 17 wherein the system resources include memory pages.

23. A computer readable medium containing a privilege promotion instruction for controlling a computer system to perform a method of promoting a current privilege level of a processor of the computer system, wherein the current privilege level controls application instruction execution in the computer system by controlling accessibility to system resources, the method comprising:
reading a stored previous privilege level state;
comparing the read previous privilege level state to the current privilege level; and
if the previous privilege level state is equal to or less privileged than the current privilege level, promoting the current privilege level to a privilege level which is higher than the current privilege level.

24. The computer readable medium of claim 23 wherein the method of promoting the current privilege level further comprises:
if the previous privilege level state is more privileged than the current privilege level, taking an illegal operation fault.

* * * * *